(12) United States Patent
Turner (10) Patent No.: US 6,464,174 B1
(45) Date of Patent: Oct. 15, 2002

(54) ROUND-TRIP ORBITAL OPERATION OF A SPACECRAFT

(75) Inventor: Andrew E. Turner, Mountain View, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/598,128

(22) Filed: Jun. 21, 2000

(51) Int. Cl.$^7$ ................................................. B64G 1/26
(52) U.S. Cl. ................................... 244/158 R; 244/172
(58) Field of Search ............................ 244/158 R, 172, 244/161, 164, 169

(56) References Cited

U.S. PATENT DOCUMENTS

| 4,754,601 | A | * | 7/1988 | Minovitch |
| 4,943,014 | A | * | 7/1990 | Harwood et al. |
| 5,595,360 | A | * | 1/1997 | Spitzer |
| 6,017,000 | A | * | 1/2000 | Scott |
| 6,102,337 | A | * | 8/2000 | Quartararo |
| 6,116,543 | A | * | 9/2000 | Koppel |
| 6,149,104 | A | * | 11/2000 | Soranno |
| 6,182,928 | B1 | * | 2/2001 | Wagner |

OTHER PUBLICATIONS

Aquarius: a low–cost, low–reliability launch vehicle for carrying consumables, Andrew E. Turner, Paper AAS 99–348, AAS/AIAA Astrodynamics Conference, Girdwood Alaska, Aug. 16–19, 1999.

* cited by examiner

*Primary Examiner*—Charles T. Jordan
*Assistant Examiner*—T. Dinh
(74) *Attorney, Agent, or Firm*—Perman & Green, LLP (57) ABSTRACT

A method for operating a spacecraft comprising the steps of placing the spacecraft in a first orbit, changing orbital altitude of the spacecraft to transfer the spacecraft from the first orbit to a second orbit, changing an orbital plane of the spacecraft from an initial orbital plane to a different orbital plane, and changing orbital altitudes of the spacecraft to return to the spacecraft from the second orbit to the first orbit. The second orbit is at a different altitude than the first orbit of the spacecraft. The orbital altitude change placing the spacecraft in the second orbit and the orbital plane change are performed at substantially the same time.

19 Claims, 5 Drawing Sheets

CONTROL OF THE POSITION OF THE SPACE CRAFT WITHIN THE ORBIT PLANE

CONTROL OF THE ORIENTATION OF
THE ORBIT PLANE IN SPACE

FIG.4A

CONTROL OF THE POSITION OF THE
SPACE CRAFT WITHIN THE ORBIT PLANE

FIG.4B

ROUND-TRIP ORBITAL OPERATION OF A SPACECRAFT

BACKGROUND OF THE INVENTION

1. Field of the Invention

The present invention relates to a spacecraft and, more particularly, to performing round-trip orbital maneuvers with a spacecraft.

2. Prior Art

A major impediment to exploitation of the economic and scientific potential provided by orbiting platforms, such as for example the International Space Station (ISS), has been the high cost of launching payloads from the Earth to the orbiting platforms. The conventional approach has generally utilized single or multi-stage expendable or partially reusable launch vehicles, such as for example the Delta, Titan, and Atlas-Centaur class of launch vehicles, or the manned Space Shuttle. These launch vehicles launch the payloads from Earth directly into the orbits of the orbiting platforms. This approach has a high cost due to the high cost of the launch vehicle itself and to the large quantity of propellant used for transporting the payload with one launcher (even if multi-staged) from the Earth's surface to the orbiting platform above. The prior art seeks to lower launch costs by launching the payloads into an initial orbit, and then using an orbiting space tug or ferry for transferring the payloads from the initial orbit to the orbit of the orbiting platforms. Use of orbiting space tugs to ferry payloads between orbits incorporates the benefits of reusability, yet, to date, the prior art's use of orbiting space tugs has resulted in a negligible reduction in the expected costs of launching payloads to the orbiting platform. The use of orbiting space tugs in the prior art has been limited merely to ferrying payloads between orbits which do not involve a significant change in orbit altitude. The reason for this is that round trips with the orbiting space tugs of the prior art between orbits which have significantly different altitudes involve using excessive quantities of propellant. Thus, to date, no known spacecraft have completed round trips from an orbiting platform to an orbit at a significantly different altitude than the platform and return. In the prior art, the excessive quantity of propellant used for performing the round trip with a space tug from the orbiting platform to, for example, the significantly lower orbit into which the earth launcher injects its payload, and return to the orbiting platform has prevented any significant launch cost reduction from being realized by using the orbiting space tug. The present invention overcomes the problems of the conventional approach as will be described in greater detail below.

SUMMARY OF THE INVENTION

In accordance with a first method of the present invention a method for operating a spacecraft is provided. The method comprises the steps of placing a spacecraft in a second orbit, changing orbital altitudes of the spacecraft to transfer the spacecraft from a first orbit to a second orbit, changing an orbital plane of the spacecraft, and changing orbital altitudes of the spacecraft to return the spacecraft from the second orbit to the first orbit. The second orbit is at a different altitude than the first orbit of the spacecraft. The change in orbital plane is from an initial orbital plane to a different orbital plane. The orbital altitude change to place the spacecraft in the second orbit and the orbital plane change are performed at substantially the same time.

In accordance with a second method of the present invention, a method for operating the spacecraft is provided. The method comprises the steps of providing the spacecraft with a maneuvering system, and operating the maneuvering system to perform a round trip maneuver with the spacecraft. The maneuvering system is used to maneuver the spacecraft in orbit. The spacecraft is placed in a first orbit. The spacecraft is maneuvered with the maneuvering system from an original position of the spacecraft in the first orbit to a second orbit. The second orbit has an altitude different than the first orbit. The spacecraft is returned with the maneuvering system from the second orbit to the original position in the first orbit. The maneuvering system is operated to substantially simultaneously change an orbital plane and orbital altitude of the spacecraft for completing the round trip maneuver with minimum energy expenditure from the maneuvering system.

In accordance with the third method of the present invention, a method for transporting a payload to a spacecraft is provided. The method comprises the steps of placing the payload in a first orbit, providing an orbital maneuvering spacecraft, operating a maneuvering thruster of the orbital maneuvering spacecraft, capturing the payload with the orbital maneuvering spacecraft, and transferring the payload from the orbital maneuvering system to the spacecraft. The spacecraft is placed in a second orbit substantially higher than the first orbit. The orbital maneuvering spacecraft is disposed in the second orbit in proximity to the spacecraft. The maneuvering thruster of the orbital maneuvering spacecraft is operated to substantially simultaneously lower an orbital altitude and change an orbital plane of the orbital maneuvering spacecraft for transferring the orbital maneuvering spacecraft from the second orbit into the first orbit. The maneuvering thruster of the orbital maneuvering spacecraft is further operated to raise orbital altitude of the orbital maneuvering spacecraft and return the orbital maneuvering spacecraft to the second orbit within sufficient proximity of the spacecraft to transfer the payload from the orbital maneuvering spacecraft to the spacecraft.

In accordance with an embodiment of the present invention, a spacecraft is provided. The spacecraft comprises a spacecraft bus, a maneuvering thruster system, and a controller. The maneuvering thruster system is mounted on the spacecraft bus. The controller is mounted on the spacecraft bus. The controller is operably connected to the maneuvering thruster system for maneuvering the spacecraft. The controller operates the thrusters for changing the spacecraft's orbital altitude and for changing an orbital plane of the spacecraft from an initial orbit of the spacecraft. The orbital plane and orbital altitude are changed by the controller substantially simultaneously.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
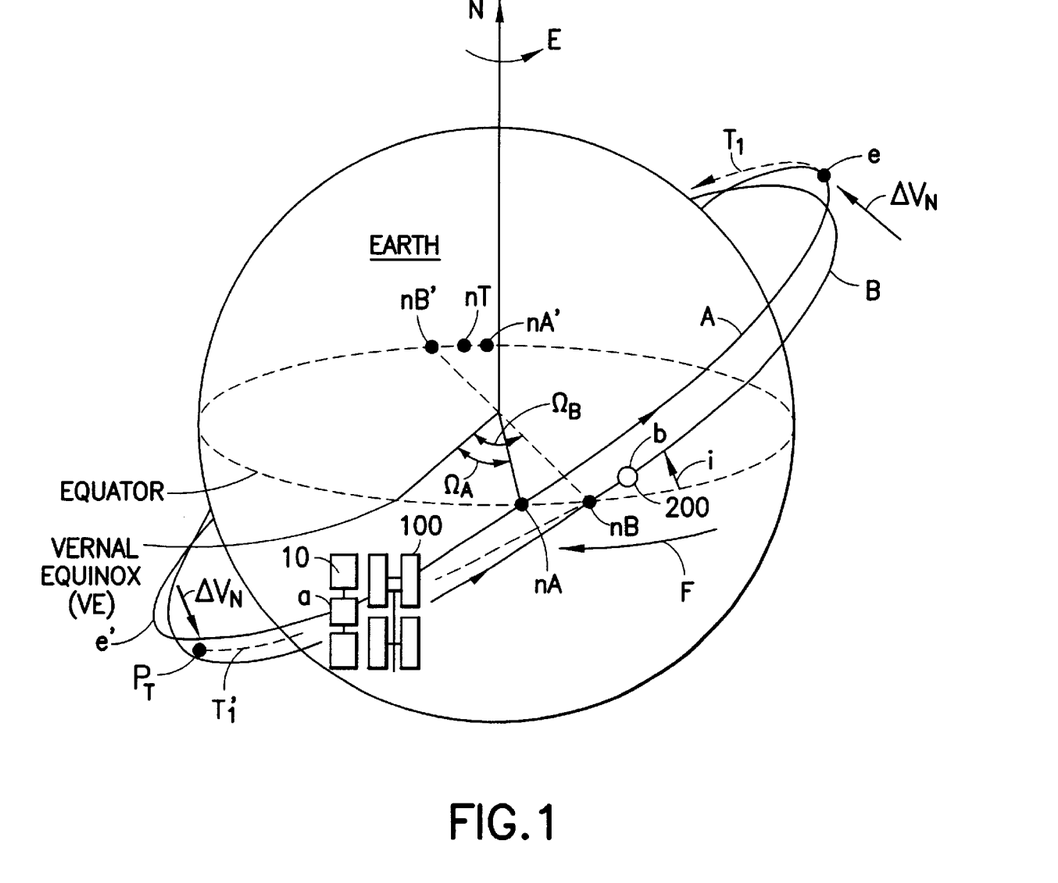
FIG. 1 is a perspective view of an orbiting spacecraft incorporating features of the present invention.

Referring to FIG. 1, there is shown a perspective view of an orbiting spacecraft 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 2:
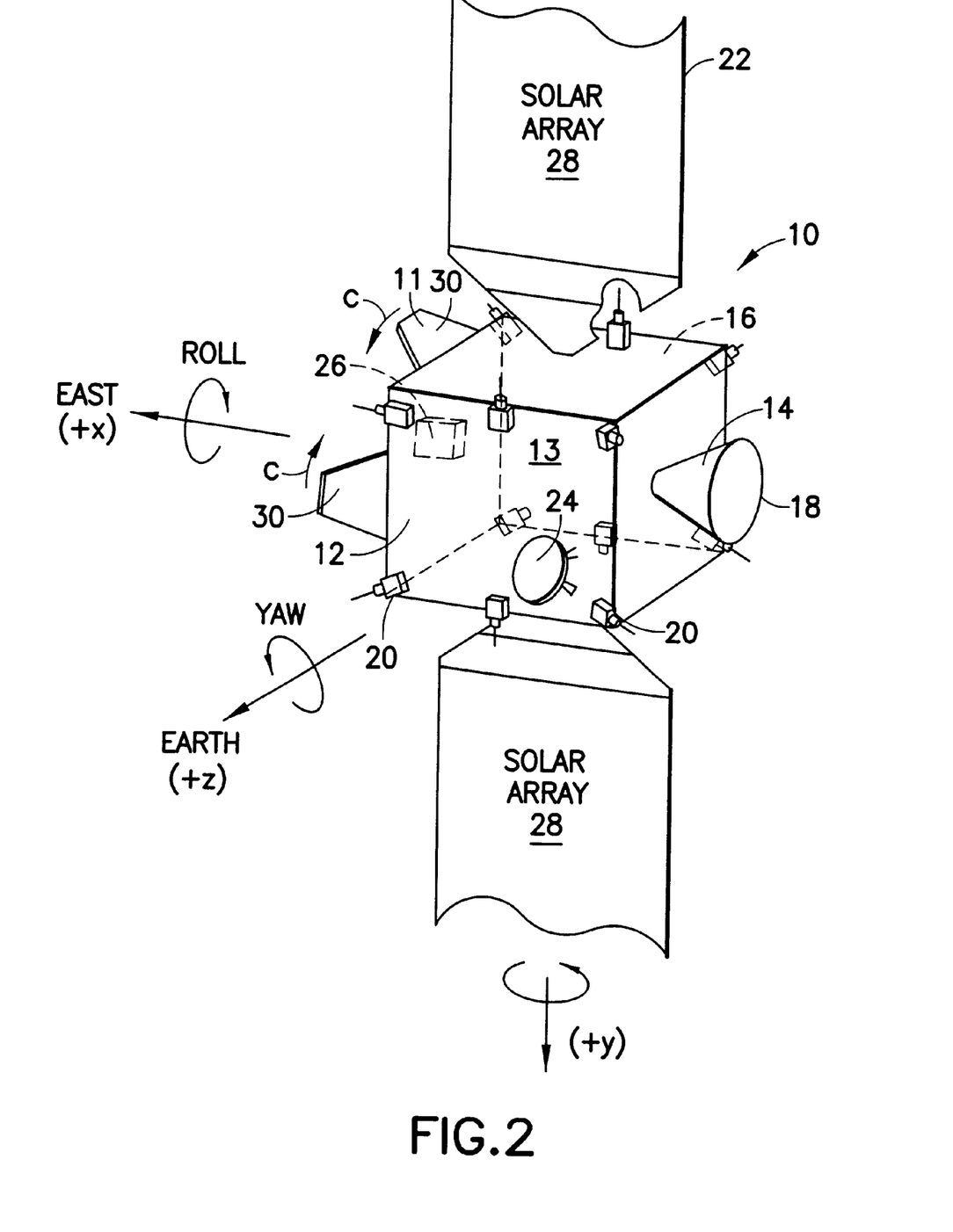
FIG. 2 is a perspective schematic view of the spacecraft in FIG. 1.

Referring now also to FIG. 2, there is shown a second perspective view of the orbital maneuvering vehicle or spacecraft 10. Orbital maneuvering spacecraft 10 generally comprises a bus 12, and a support section 11, mounted to the bus 12. The spacecraft bus 12 includes a spacecraft maneuvering system 14, and an electrical power system 22. The maneuvering system 14 is used for maneuvering the spacecraft, and for attitude control. The electrical power system 22 provides electrical power to bus 12 and if necessary to a payload module (not shown) held by the supporting section 11. The spacecraft bus 12 also includes a communication system 24 for communicating with ground stations (not shown) and with other spacecraft. As seen in FIG. 1, spacecraft 10 is orbiting the earth in orbit A. The spacecraft 10 may be docked or otherwise coupled to an orbital platform or depot 100, such as for example, the International Space Station (ISS) also in orbit A. Otherwise, the spacecraft may be orbiting in orbit A in close formation with the orbital platform so that the spacecraft may be readily docked to the orbital platform. A payload module 200 is orbiting in orbit B which is different than orbit A in which the orbital maneuvering spacecraft 10, and depot 100 are orbiting. The payload module 200 may have been launched from earth and placed in orbit B using a suitable launch vehicle. The payload in payload module 200, such as for example spare parts, or consumables, including water, food, fuel, personal items, or specialized equipment is destined for depot 100. In alternate embodiments, the payload module which may carry any other type of suitable payload may have been placed in orbit B using any other suitable means such as an intermediate orbital maneuvering spacecraft. The maneuvering system 14 is operated to transfer spacecraft 10 from orbit A to orbit B. The spacecraft 10 captures the payload module 200 with the payload support section 11 and again using the maneuvering system 14 is returned to orbit A. The spacecraft 10 is transferred to orbit A returning substantially to its original position in orbit A proximate to the depot 100. The spacecraft 10 completes a round trip from orbit A to orbit B and returns to orbit A preferably with payload module 200 captured thereto. The spacecraft 10 completes the round trip by expending a minimum amount of propellant from maneuvering system 14 as will be described in greater detail below. The spacecraft 10 may further be maneuvered from its proximate position to dock with depot 100 in orbit A in order to transfer the payload module 200 to the depot.

In particular, still referring to FIG. 2, the spacecraft bus 12 has a frame 13. The maneuvering system 14 of the spacecraft 10 generally comprises at least one main, or maneuvering thruster 18, and attitude thrusters 20 which are mounted to the bus frame 13. The main thruster 18 is sized preferably for delivering sufficient thrust for performing spacecraft orbit raising and lowering maneuvers and to change the orbital plane of the spacecraft 10. The main thruster 18 preferably, uses monopropellant hydrazine ($N_2 H_4$). The monopropellant hydrazine is stored in suitable tanks (not shown) and is fed to the main thruster 18 using suitable piping and injectors (not shown) housed within the bus 12. The monopropellant hydrazine provides the main thruster 18 with a specific impulse of about 230 seconds and an efficiency of 0.95. In alternate embodiments, the main thruster may be any other suitable type of thruster, such as for example, an electropropulsion thruster, or gas thruster, and may use any suitable type of fuel including for example, solid propellant, bi-propellant fuels, or cold gas. As shown in FIG. 2, the attitude thrusters 20 may be mounted on the bus 12 in thruster strings though the attitude thrusters may be disposed in any other suitable manner. The attitude thrusters 20 are capable of changing the orientation of the spacecraft 10 about the three axes (X,Y,Z) of the spacecraft 10. In the preferred embodiment, the attitude thrusters 20 are cold gas thrusters using pressurized helium (He), although any suitable type of low thrust thruster may be used including electric propulsion thrusters using any suitable type of fuel. The pressurized helium is stored in suitable tanks (not shown) on the bus. The pressurized helium provides the attitude thrusters 20 with a specific impulse of about 160 seconds and an efficiency of about 0.9. In addition to the attitude thrusters 20, the spacecraft 10 may have an attitude stabilization system (not shown) comprising one or more momentum wheels for stabilizing the spacecraft attitude about one or more axis as desired. The operation of the main and attitude thrusters 18, 20 of the spacecraft maneuvering system 14, as a well as the attitude stabilization system if any, is controlled by a controller 26 within the bus 12. Electrical power for the controller operation as well as for the operation of the maneuvering system 14 or the various subsystems (e.g. valves, injectors) supporting operation of the thrusters 18, 20 is provided by the spacecraft's electrical power system 22. In the preferred embodiment, the electrical power system 22 comprises a pair of solar panels 28 which depend from the bus frame. In alternate embodiments, the spacecraft power system may have any suitable number of solar panels disposed on the bus. The power system 22 may also include a suitable number of batteries (not shown) for storing power from the solar panels and powering the spacecraft systems when the solar panels are in shadow. The communication system 24 of the spacecraft 10 allows bi-directional communication between the spacecraft controller 26 and the ground stations. The communication system 24 includes directional, and omni-directional antennas 24 A (only one directional antenna is shown for example purposes in FIG. 2) which are connected by appropriate transmitters and receivers and electrical conduits to the controller 26. By way of example, the controller 26 may thus transmit spacecraft ephemeris data to the ground stations. The controller 26 may in turn receive programming changes or updates from the ground stations for executing spacecraft housekeeping functions or performing spacecraft maneuvers. The payload support section 11 preferably includes clamping members 30 operably mounted (e.g. hinged) to the bus frame 13. The clamping. members 30 are articulated to move between an open and close position (as indicated by arrows C). By way of example, the members 30 may be moved to the close position to capture a module and secure the payload module to the spacecraft bus during spacecraft maneuvers. The clamping members 30 may be opened to release the module. The position of the clamping members 30 is commanded by the controller 26. Suitable drive motors (not shown) mounted on the spacecraft bus and powered by the electrical power system 22 move the clamping members 30 between the open and closed positions. In alternate embodiments, the support sections of the spacecraft may have any other suitable configuration for capturing and securing payload modules to the spacecraft bus. In still other ultimate embodiments, the spacecraft bus may have several support sections distributed thereon. It is also possible that an adapter may be fitted to the spacecraft bus for temporary use in capturing and holding a specialized payload.

In FIG. 1, the spacecraft 10 is shown to be orbiting the earth in low earth orbit (LEO), and the present invention will be described below with particular reference to LEO spacecraft though, this invention applies equally to spacecraft in medium earth orbits(MEO) or in geosynchronous orbits (GEO). In the preferred embodiment, the initial orbit A of the spacecraft 10 is substantially circular having a predetermined orbital radius. The orbit A is a pro-grade orbit with a suitable inclination i such as for example 51.6 degrees, the same as the inclination of the ISS orbit. In alternate embodiments, the spacecraft may have any suitable type of orbit such as an elliptical orbit. In other alternate embodiments, the spacecraft orbit may be a retrograde orbit (i.e. inclination i is greater than 90 degrees). The right ascension of the ascending node (RAAN) $\Omega_A$ (i.e. the angle between the Vernal Equinox (VE), a standard reference direction, and the ascending node $n_A$ of orbit A measured eastward in the plane of the equator) of spacecraft orbit A varies with time due to nodal regression of the orbit as indicated by arrow F (see FIG. 1). Nodal regression of the spacecraft orbit is caused by the variation in the Earth's gravitational field due to the oblate shape of the Earth. Differential nodal regression occurs between two circular orbits with the same inclination but different altitudes. This is caused by the latitude variation in the Earth's gravitational field which is more pronounced at lower altitude. At a given point in time, orbit A has a given RAAN $\Omega_A$ (as shown in FIG. 1) The nodal regression of orbit A results in the regression of position a of spacecraft 10 shown in FIG. 1, such that the position a of the spacecraft 10 during successive orbits is rotated clockwise with the regression of orbit A (as indicated by arrow F). As noted before, in position a the spacecraft 10 may be docked to a suitable docking port (not shown) of depot 100. Otherwise, the spacecraft 10 may be orbiting in close formation with depot 100 such that the spacecraft 10 may be readily docked to the depot 100 merely by using the attitude thrusters 20 of the spacecraft. Accordingly, spacecraft 10 and depot 100 are in substantially the same orbit A and generally share the same position a within orbit A. FIG. 1 shows the payload module 200 in orbit B which is also a LEO circular orbit distant from orbit A of depot 100. In the preferred embodiment, orbit B is significantly lower than orbit A of spacecraft 10 and depot 100. In alternate embodiments, orbit B of payload module 200 may be at any other suitable altitude including a higher altitude the orbit A. Orbit B of the payload module is a pro-grade orbit having substantially the same angle of inclination i as orbit A of spacecraft 10. The orbital plane of orbit B of payload module 200 is different than the orbital plane of spacecraft orbit A. In particular, the RAAN $\Omega_B$ of orbit B is greater than the RAAN $\Omega_A$ of the spacecraft orbit A at the time the orbits are shown in FIG. 1. Hence, as seen in FIG. 1, the payload module 200 destined for depot 100 is initially in a different orbit B at a lower altitude and having a different orbital plane than orbit A of depot 100 and spacecraft 10. The lower orbit B of payload module 200 undergoes nodal regression, in the same direction (indicated by arrow F in FIG. 1) as orbit A. However, as described previously, the lower orbit B of payload module 200 has a higher rate of nodal regression than the orbit A of depot 100. Hence, during successive orbits, the differential nodal regression between orbit A and orbit B causes the RAAN $\Omega_A$ of orbit B to become smaller such that at some future time the RAAN $\Omega_B$ of orbit B may be the same as RAAN $\Omega_A$ of orbit A. At a particular instant in time, the orbital planes of orbit A, and B will substantially coincide. In accordance with the present invention, the spacecraft 10 is operated to take advantage of the difference in the rate of nodal regression between the initial orbit A and the lower orbit B of the payload module 200 and complete the ferrying of the payload module to depot 100 in orbit A with minimum expenditure of propellant by the spacecraft as will be described below.

Figure 3A:
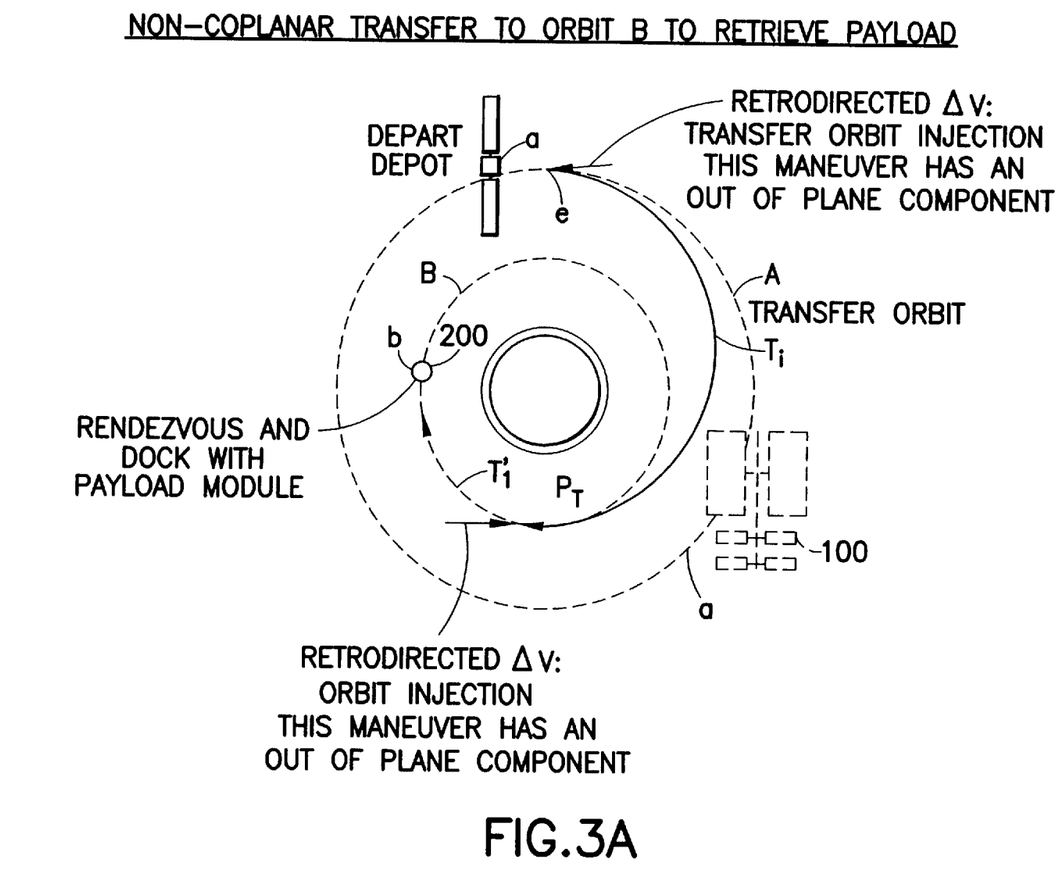
FIGS. 3A–3B are plan views substantially normal to the plane of the spacecraft orbit shown in FIG. 1, respectively showing the spacecraft being lowered from a first orbit to a second orbit, and being raised from the second orbit to the higher first orbit.
Figure 4A:
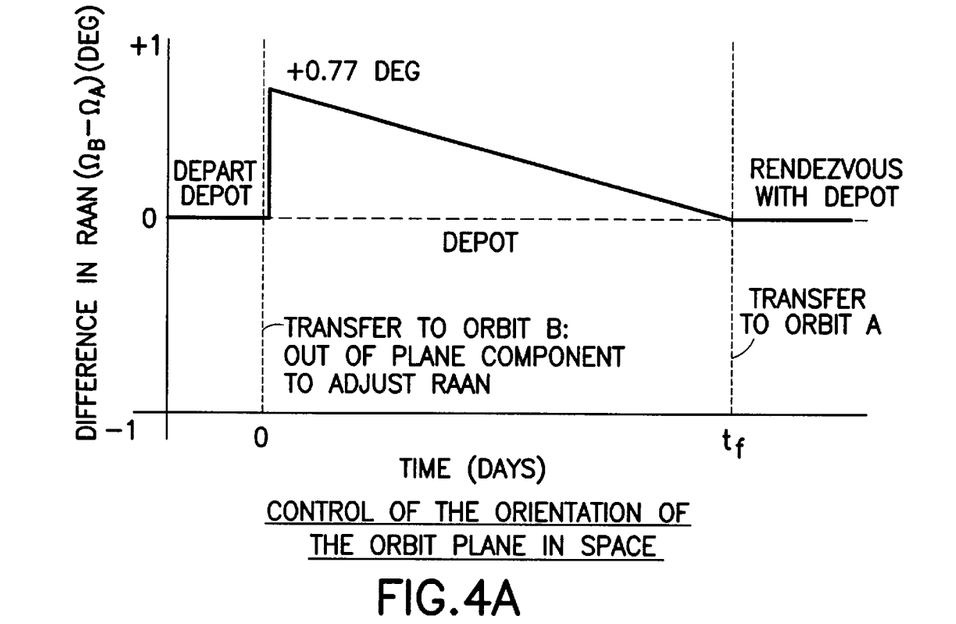
FIGS. 4A–4B are graphs respectively showing the difference over time of the Right Ascension of the Ascending Node (RAAN) of the spacecraft orbit relative to an initial orbit of the spacecraft, and the difference over time of the angular position of the spacecraft in orbit relative to the initial orbital position of the spacecraft within the orbit plane.

FIGS. 3A–3B, and 4A–4B generally illustrate the module ferrying operation performed by spacecraft 10 starting at orbital position a in orbit A and returning to the orbital position a. The orbital position a of orbiting spacecraft 10 is the recurrent position of the spacecraft in its orbit at predetermined periods of time which are equal in length to the orbital period of orbit A. Accordingly, during the period in which spacecraft 10 completes an orbit, orbital position a (also the position of depot 100) also completes an orbital revolution. The payload module ferrying operation is commenced, preferably, when the spacecraft 10 in orbital position a is at either the northern or southern anti-nodes e, $e^1$ of orbit A. In FIG. 1, the ferrying operation is shown, for example purposes, as commencing from the northern anti-node e. Prior to starting the maneuver, the spacecraft 10 may be uncoupled from depot 100. As seen in FIG. 2, the payload support section 11 of spacecraft 10 is empty or at least carrying less mass than the spacecraft will carry when loaded at a later time. The controller 26 operates the attitude thruster 20, preferably, in accordance with programming stored in the controller 26, to orientate the spacecraft so that the main thruster 18 is pointed in a suitable direction. In this position, the main thruster 18 is generally pointed opposite to the direction of travel (retro-direction) in orbit A so that the thruster operation lowers the spacecraft orbit. The main thruster 18 also points out of plane to orbit A (e.g. points south if spacecraft 10 is at anti-node e) so that the thruster operation changes the orbital plane of spacecraft 10 substantially simultaneously with the lowering of the orbit. When spacecraft 10 reaches anti-node e, the controller 26 commands main thruster firing. The controller 26 may be coupled to a position sensor such as for example a startracker, or sun tracker, or GPS navigation which indicates to the controller when the spacecraft reaches anti-node e. In response, the controller 26 sends the thruster firing command. In accordance with its programming, the controller 26 fires the thruster 18 for sufficient duration to generate the desire of retro-directed change in velocity $\Delta V$ for injecting the spacecraft 10 into transfer orbit T1 (see FIG. 1 and 3A). The retro-directed $\Delta V$ generated by main thruster 18 has a northward out of plane component $\Delta V_N$ (indicated by arrow in $\Delta V_N$ FIG. 1) giving transfer orbit to T1 a different orbital plane than initial orbit A of spacecraft 10. As can be seen in FIG. 1, transfer orbit T1 approaches orbit B, the descending node $n_T$ of the transfer orbit being located eastward relative to the descending node $n_A'$ of the initial orbit A but still west of the descending node $n_B'$ of orbit B. The perigee $P_T$ of the transfer orbit T1 is at the same orbital altitude as orbit B as shown in FIG. 3A. When the spacecraft 10 reaches perigee $P_T$, the controller 26, which may be receiving appropriate input from the position sensor (not shown) sends another firing command to the main thruster 18. Here, the main thruster 18, is fired for sufficient duration to generate the desired retro-directed ΔV to inject spacecraft 10 into circular orbit T1' substantially similar to circular orbit B (see FIGS. 1 and 3A). The retro-directed ΔV generated by the thruster 18 at perigee $P_T$, however, has a southward out of plane component (indicated by arrow $\Delta V_s$ in FIG. 1). This effects a further eastward change in the orbital plane of spacecraft 10 sending the spacecraft along orbit T1' into orbit B. The change in orbital altitude, and orbital plane are again effected substantially simultaneously. At completion of the orbit transfer maneuver shown in FIGS. 1 and 3A, the spacecraft 10 is in orbit B with the RAAN $\Omega_B$. The difference between the RAAN $\Omega_B$ of the spacecraft 10 relative to the RAAN $\Omega_A$ orbit A is shown in FIG. 4A. Time to in FIG. 4A corresponds to the start of the ferrying operation. Although, the thruster 18 operations at anti-node e of orbit A, and at perigee $p_T$ have been described as a single firing event, in alternate embodiments the thruster may be fired in a series of pulses to obtain the desired ΔV for both the change in orbital altitude and orbital plane. During thruster firing, the controller 26 preferably monitors the ΔV generated during thruster operation using suitable onboard sensors such as for example gyroscopes or accelerometers (not shown), or GPS navigation systems. Measured ΔV values may be compared to desired values in a control loop of the controller 26 which then may adjust the orientation of the main thruster and the duration of its operation to achieve the proper ΔV.

In the preferred embodiment, shown in FIGS. 1 and 3A, the module 200 is in orbit B at the time ($t_0$) the spacecraft 10 is transferred from orbit A to orbit B. The position b of the module 200 in orbit B is proximate to the spacecraft 10 injected into orbit B to allow the spacecraft to capture the module. In alternate embodiments, the payload module may be inserted into orbit B at any time so that the module is positioned sufficiently close to the spacecraft to allow capture of the module. Rendezvous between the spacecraft 10 and module 200 is controlled by controller 26. The controller 26 preferably uses inputs from GPS navigation to approach the module up to a distance of within a few hundred meters. In this region of separation, the controller 26 may receive inputs indicating relative distances and speed to the module from suitable range finding equipment (not shown) on the spacecraft 10. The range finding equipment may include for example, laser range finders, or imaging equipment capable or detecting changes in the relative positions between module and spacecraft. The controller 26 processes the inputs from the range finding equipment, and in response, operates the spacecraft attitude thrusters to close the spacecraft 10 with payload module 200. The spacecraft 10 is orientated to allow the payload support section 11 (see FIG. 2) to capture the payload module 200.

Figure 4B:
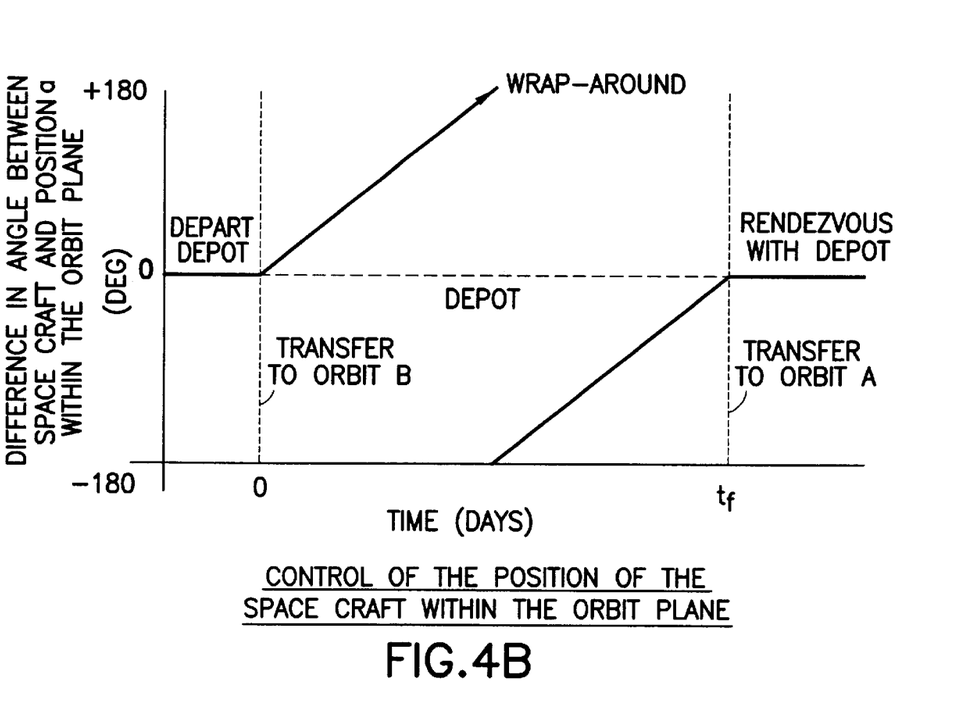

Spacecraft 10 remains in orbit B for a pre-determined period of time $t_f$ to allow the spacecraft 10 to become in phase with position a (i. e. position of depot 100) in orbit A. The period $t_f$ indicated in FIGS. 4A and 4B, depends on the difference in the orbital radius of orbital altitude between orbit A and orbit B as well as the difference in RAAN at time $t_o$ between orbit A and orbit B. The orbital rate of the spacecraft 10 in lower orbit B is greater than the orbital rate of position a in orbit A. The difference in orbital rate allows the spacecraft 10 in orbit B to close the depot 100 at position a in orbit A so that, after the period $t_f$ the spacecraft's orbit may be raised to return the spacecraft 10 to the position a. The relative orbital position of the spacecraft to position a is shown in FIG. 4B. In addition, the rate of nodal regression (in the direction indicated by arrow F in FIG. 1) of the spacecraft 10 in orbit B is greater than the nodal regression rate of position a in orbit A. Accordingly, the difference in the rate of nodal regression between orbit B and orbit A decreases the difference in the RAAN ($\Omega_B - \Omega_A$) of the two orbits as shown in FIG. 4A. At the time, $t_f$ the difference in the RAAN is approximately zero, and orbit B as substantially in the same orbital plane as orbit A. The orbital rate and nodal regression rate of the spacecraft orbit is not affected by the spacecraft capture of payload module 200. In the preferred embodiment, shown in FIGS. 1 and 3A, the spacecraft 10 captures one payload module 200, though in alternate embodiments the spacecraft may capture as many payload modules as desired when in orbit B.

Figure 3B:
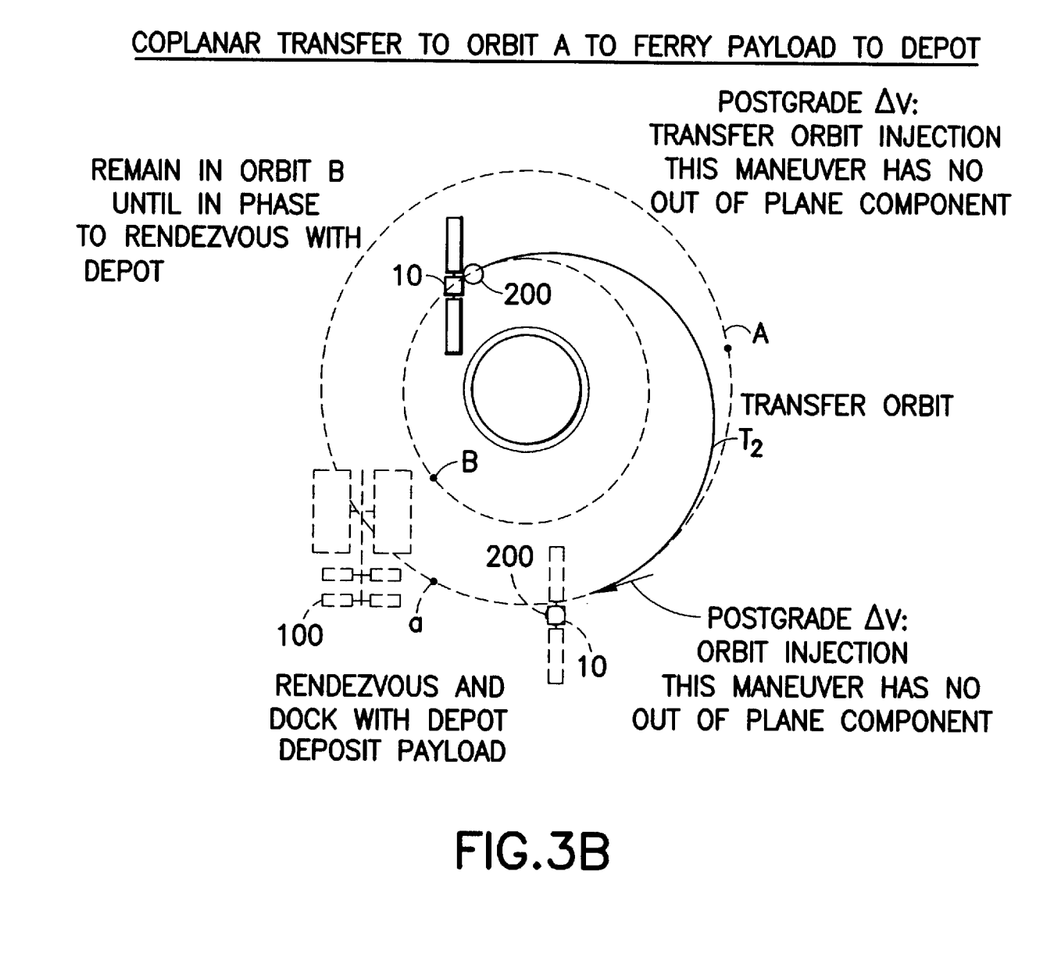

FIGS. 4A through 4B indicate that the spacecraft 10 with the captured payload module 200 becomes in phase with position a, and hence with depot 100, in orbit A at the time $t_F$. At this time, the spacecraft 10 is orientated to initiate orbit-raising maneuvers shown in FIG. 3B to ferry the payload module 200 to depot 100 in orbit A. Controller 26 uses the attitude thruster 20 (see FIG. 2) to orientate the spacecraft, now carrying the added mass of the captured payload module, so that the main thruster 18 points in a desired direction for orbit transfer. The controller 26 operates the main thruster 18 to generate the desired ΔV to inject the spacecraft 10 with payload module 200 into transfer orbit T2 shown in FIG. 3B. In this case, there is no substantial out of plane ΔV component generated by thruster 18. The transfer orbit T2 thus has the same orbital plane as orbits A and B. As seen in FIG. 3B, as the spacecraft 10 reaches the perigee of orbit T2, the controller 26 again operates the thruster 18 generating sufficient ΔV to inject the spacecraft with module 200 into orbit A. Spacecraft and module are thus returned substantially to position a in orbit A thereby completing the round trip maneuver. In this position, the spacecraft 10 and module 200 may be maneuvered into a docked position with the depot 100.

Table 1 shows spacecraft parameters and performance characteristics illustrating one example of a round trip maneuver to ferry a payload module 200 from a lower circular orbit B with an orbital altitude of about 200 kilometers to a higher destination orbit A having an altitude of about 400 kilometers. Both orbits have an angle of inclination i of about 51.6°.

TABLE 1

| Trip Elapsed Time (Days) t | Event | Maneuver ΔV (m/s) | Mass Decrement (kg) | Total System Mass (kg) |
|---|---|---|---|---|
| 0 | Depart Depot | 1 | 1 | 1648 |
| 0.1 | Lower orbit from 400 km to 200 km, adjust RAAN +.77° | 142 | 106 | 1647 |
| 0.1–1.0 | Rendezvous/dock with Payload Modules | 30 | 91(+5000) | 1541 (6541)* |
| 1.4 | Raise orbit from 200 km to 400 km, co-planar maneuver | 116 | 340 | 6450 |
| 1.5 | Dock with Depot, exchange payloads | 2.3 | 10 | 6100 |

*The total system mass assumes that the entire 6450 kg of mass of the spacecraft 10 plus all payload modules is maneuvered with a ΔV of 30 m/s, which involves an expenditure of 91 kg of fuel. The system mass increases by 5000 kg when the spacecraft acquires five payloads.

Total system mass in Table 1 is the mass of the orbital maneuvering spacecraft 10 plus any payloads that it may be carrying. In this case, the spacecraft 10 preferably has a dry mass of about 1000 kg. The spacecraft 10 holds approximately 648 kg of fuel on board for maneuvering system 14. As can be seen from Table 1, the spacecraft spends 548 kg of fuel to complete the round trip maneuver, carrying 5000 kg from the lower orbit B to the depot 100 in orbit A. Approximately 100 kg of fuel are left on board at the end of the trip as a reserve. The 5000 kg payload raised by the spacecraft from orbit B may be one payload module 200 or a number (e.g. five) payload modules sequentially captured by the spacecraft when in orbit B. To perform the round trip between circular orbit A, at 400 kilometers altitude, and circular orbit B at 200 kilometers altitude, with the spacecraft identified in Table 1, a difference in RAAN ($\Omega_B - \Omega_A$) of approximately +0.770° is generated during the orbital plane change maneuver. The figures shown on Table 1 are merely representative of one example of an orbital maneuvering spacecraft performing a round trip payload ferrying operation. Spacecraft characteristics and performance, however, may be as desired to complete round trip payload operations between any desired orbits.

The present invention provides an orbital maneuvering spacecraft, and a method for operating the spacecraft to perform a round trip between orbits of significantly different altitudes, returning to the original position in the original orbit with a substantial payload while expending a minimum amount of propellant to complete the round trip. This allows the spacecraft to ferry numerous payloads from a low orbit to a depot, in a significantly higher orbit than the payloads, with minimum expenditures of propellant. The spacecraft 10 may also repeatedly perform the payload ferrying round trip to the higher depot which facilitates lower launch cost for each payload destined for the depot. By comparison, in the prior art, space tugs cannot perform this payload ferrying round trip between orbits at significantly different altitudes. Hence unlike the instant invention, in the prior art space tugs are not capable of facilitating significant cost reductions in launching payloads to depots such as the ISS.

It should be understood that the foregoing description is only illustrative of the invention. While the present invention has been particularly described with respect to a preferred sequence of process steps in its method claims and certain elements in its preferred embodiment, it will be understood that the invention is not limited to these particular methods and spacecraft described in the preferred embodiments, the process steps, the sequence, or the final structures depicted in the drawings. On the contrary, it is intended to cover all alternatives, modifications, and equivalents as may be included within the spirit and scope of the invention defined by the appended claims. In particular, the scope of the invention is intended to include, for example, spacecraft operated to complete round trips between any distant orbits. In addition, other methods and/or devices may be employed in the spacecraft and its method for operating of the instant invention as claimed with similar results. Various alternatives and modifications can be devised by those skilled in the art without departing from the invention. Accordingly, the present invention is intended to embrace all such alternatives, modifications and variances which fall within the scope of the appended claims.

What is claimed is:

1. A method for operating a spacecraft, the method comprising the steps of:
   placing the spacecraft in a first orbit;
   changing orbital altitude of the spacecraft to transfer the spacecraft from the first orbit to a second orbit at a different altitude than the first orbit of the spacecraft;
   changing an orbital plane of the spacecraft from an initial orbital plane to a different orbital plane; and
   changing orbital altitude of the spacecraft to return the spacecraft from the second orbit to the first orbit;
   wherein the orbital altitude change to place the spacecraft in the second orbit and the orbital plane change are performed at substantially the same time.

2. A method for operating a spacecraft in accordance with claim 1, wherein the spacecraft has an initial position in the first orbit before changing orbital altitude to the second orbit, and wherein changing orbital altitude to return the spacecraft to the first orbit comprises returning the spacecraft substantially to the initial position of the spacecraft in the first orbit so that the spacecraft completes a round trip.

3. A method for operating a spacecraft in accordance with claim 2, further comprising the step of providing the spacecraft with a maneuvering thruster system for changing the orbital altitude and the orbital plane of the spacecraft, and wherein the maneuvering thruster system expends a minimum amount of propellant to complete the round trip of the spacecraft.

4. A method for operating a spacecraft in accordance with claim 1, further comprising the step of leaving the spacecraft in the second orbit for a predetermined period of time so that changing orbital altitude of the spacecraft to return the spacecraft to the first orbit returns the spacecraft to an initial position of the spacecraft in the first orbit.

5. A method for operating a spacecraft in accordance with claim 1, wherein the first orbit has a substantially higher altitude than the second orbit.

6. A method for operating a spacecraft in accordance with claim 1, further comprising the step of adding payload to the spacecraft when the spacecraft is in the second orbit.

7. A method for operating a spacecraft in accordance with claim 1, wherein the initial orbital plane corresponds to the first orbit and the different orbital plane corresponds to the second orbit.

8. A method for operating a spacecraft in accordance with claim 7, wherein a right ascension of an ascending node (RAAN) of the second orbit is displaced eastward relative to a RAAN of the first orbit when the spacecraft is transferred from the first orbit to the second orbit.

9. A method for operating a spacecraft in accordance with claim 1, wherein the second orbit and the first orbit are substantially co-planar when changing orbital altitude of the spacecraft to return the spacecraft to the first orbit.

10. A method for operating a spacecraft comprising the steps of:
    providing the spacecraft with a maneuvering system for maneuvering the spacecraft in orbit, the spacecraft being placed in a first orbit;
    operating the maneuvering system for performing a round trip maneuver with the spacecraft from an original position of the spacecraft in the first orbit to a second orbit having an altitude different than the first orbit and returning the spacecraft to the original position in the first orbit;
    wherein the maneuvering system is operated to substantially simultaneously change an orbital plane and orbital altitude of the spacecraft for completing the round-trip maneuver with minimum energy expenditure from the maneuvering system.

11. A method for operating a spacecraft in accordance with claim 10, wherein the altitude of the second orbit is less than the first orbit.

12. A method for operating a spacecraft in accordance with claim 10, wherein the orbital plane and orbital altitude are changed substantially simultaneously with the maneuvering system when transferring the spacecraft from the first orbit to the second orbit during the round trip maneuver.

13. A method for operating a spacecraft in accordance with claim 10, wherein the change of the orbital plane effects a change from a first orbital plane corresponding to the first orbit having a first right ascension of the ascending node (RAAN) to a second orbital plane corresponding to the second orbit with a second RAAN eastward from the first RAAN of the first orbit when the spacecraft is transferred from the first orbit to the second orbit during the round trip maneuver.

14. A method for operating a spacecraft in accordance with claim 10, wherein the spacecraft holds a payload, and wherein when the spacecraft is in the second orbit during the round trip maneuver the spacecraft payload is increased so that the spacecraft payload is greater upon return to the first orbit to complete the round trip maneuver than when starting the round trip maneuver.

15. A method for operating a spacecraft in accordance with claim 10, wherein the step of operating the maneuvering system for performing the round trip maneuver comprises maintaining the spacecraft with the maneuvering system in the second orbit for a period of time so that the second orbit and the first orbit are in the same orbital plane, and raising the orbital altitude of the spacecraft with the maneuvering system to return the spacecraft to the first orbit and complete the round trip maneuver.

16. A method for transporting a payload to a spacecraft comprising the steps of:

placing the payload in a first orbit, and placing the spacecraft in a second orbit substantially higher than the first orbit;

providing an orbital maneuvering spacecraft (OMS), the OMS being disposed in the second orbit in proximity to the spacecraft;

operating a maneuvering thruster of the OMS to substantially simultaneously lower orbital altitude and change an orbital plane of the OMS for transferring the OMS from the second orbit into the first orbit;

capturing the payload in the first orbit with the OMS; and operating the maneuvering thruster of the OMS to raise orbital altitude of the OMS and return the OMS to the second orbit within sufficient proximity of the spacecraft to transfer the payload from the OMS to the spacecraft.

17. A method for transporting a payload to a spacecraft in accordance with claim 16, wherein the first orbit has a right ascension of the ascending node (RAAN) located eastward relative to a RAAN of the second orbit when the maneuvering thruster of the OMS is operated to transfer the OMS from the second orbit to the first orbit.

18. A method for transporting a payload to a spacecraft in accordance with claim 16, wherein the first orbit and the second orbit have substantially the same orbital plane when the maneuvering thruster of the OMS is operated to return the OMS to the second orbit.

19. A spacecraft comprising:

a spacecraft bus;

a maneuvering thruster system mounted on the spacecraft bus; and a controller mounted on the spacecraft bus, and operably connected to the maneuvering thruster system for maneuvering the spacecraft;

wherein the controller operates the maneuvering thruster system for changing spacecraft orbital altitude and for changing an orbital plane of the spacecraft from an initial orbit of the spacecraft, the orbital plane and orbital altitude being changed substantially simultaneously by the controller wherein the change of orbital plane is such that the spacecraft has another orbit with a right ascension of the ascending node (RAAN) different than the initial orbit.

* * * * *